(12) United States Patent
Togawa

(10) Patent No.: US 6,377,954 B1
(45) Date of Patent: *Apr. 23, 2002

(54) OBJECT-ORIENTED PROCESSING SYSTEM AND OBJECT-ORIENTED CASE APPARATUS

(75) Inventor: Yoshifusa Togawa, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/832,966

(22) Filed: Apr. 4, 1997

(51) Int. Cl.[7] ............................................. G06F 17/00
(52) U.S. Cl. ...................... 707/103; 707/101; 707/102
(58) Field of Search ......................... 707/103, 1, 200, 707/101, 102; 709/315, 316

(56) References Cited

U.S. PATENT DOCUMENTS

| | | | | |
|---|---|---|---|---|
| 5,313,630 A | * | 5/1994 | Namioka et al. | 707/103 |
| 5,313,633 A | * | 5/1994 | Tomita et al. | 707/1 |
| 5,335,346 A | * | 8/1994 | Fabbio | 707/103 |
| 5,617,564 A | * | 4/1997 | Tomotake | 707/200 |
| 5,659,723 A | * | 8/1997 | Dimitrios et al. | 707/103 |
| 5,758,349 A | * | 5/1998 | Bresleau et al. | 1/1 |
| 5,850,544 A | * | 12/1998 | Parvathaneny et al. | 707/101 |
| 6,085,034 A | * | 7/2000 | Danforth | 709/315 |
| 6,101,501 A | * | 8/2000 | Breslau et al. | 707/103 |
| 6,163,813 A | * | 12/2000 | Jenney | 709/315 |
| 6,182,156 B1 | * | 1/2001 | Togawa | 709/316 |

FOREIGN PATENT DOCUMENTS

JP 6-236315 8/1994

OTHER PUBLICATIONS

Shi et al., "O2 ADL: An Object–Oriented Analog VLSI Design Language", IEEE, 1996, pp. 27–30.*

Zhang, "Object–Oriented Design for Image Processing Applications", IEEE, 1995, pp. 440–444.*

Borland International, "Borland announces preview of Borland C++ Builder at SoftDev WebDev '96", M2 Communications, Nov. 25.*

Raimund K. Ege, "Programming in an Object–Oriented Environment", Academic Press, Inc, pp. 63–72, 1992.*

* cited by examiner

Primary Examiner—Thomas Black
Assistant Examiner—Thuy Pardo
(74) Attorney, Agent, or Firm—Staas & Halsey LLP

(57) ABSTRACT

Changing the properties and/or behavior (the character) of an object is accomplished by setting a dynamically changeable inheritance (character inheritance) for the object. An object-oriented processing system comprises a database which stores a plurality of objects, a character inheritance setting unit which sets a character inheritance according to an instruction and thereby accomplishes a corresponding character, and a sensor input/output unit which stores a story definition part that describes a procedure for instructing the character inheritance setting unit to change the character according to the passage of time or to a change in an external environmental condition. An object-oriented CASE apparatus comprises a character inheritance creation unit for interactively creating a plurality of selectable character inheritances and for storing the character inheritances in the character inheritance setting unit, and a story definition part creation unit for creating the story definition part and stores it in the sensor input/output unit.

18 Claims, 18 Drawing Sheets

Fig. 4

| ID NUMBER | IDENTIFICATION INFORMATION NAME |
|---|---|

IDENTIFICATION INFORMATION

```
IDENTIFICATION : 0001 = CHARACTER STRING
INFORMATION     0010 = VOICE
                0011 = VOICE WITH TEXT
                0100 = MOVING IMAGE
                0101 = MOVING IMAGE WITH TEXT
                0110 = MOVING IMAGE WITH VOICE
                0111 = MOVING IMAGE WITH VOICE AND TEXT
                1000 = STILL IMAGE
                1001 = STILL IMAGE WITH TEXT
                1010 = STILL IMAGE WITH VOICE
                1011 = STILL IMAGE WITH VOICE AND TEXT
                1100 = STILL IMAGE/MOVING IMAGE COMBINED
                1101 = STILL IMAGE/MOVING IMAGE COMBINED, WITH TEXT
                1110 = STILL IMAGE/MOVING IMAGE COMBINED, WITH VOICE
                1111 = STILL IMAGE/MOVING IMAGE COMBINED, WITH TEXT AND VOICE
```

| NUMBER | IDENTIFICATION INFORMATION | POINTER |
|---|---|---|
| | | |
| ... | ... | |

NUMBER: THE NUMBER OF REGISTERED POINTERS

IDENTIFICATION
INFORMATION :
00001 = CHARACTER STRING
00010 = VOICE
00011 = VOICE WITH TEXT
00100 = MOVING IMAGE
00101 = MOVING IMAGE WITH TEXT
00110 = MOVING IMAGE WITH VOICE
00111 = MOVING IMAGE WITH VOICE AND TEXT
01000 = STILL IMAGE
01001 = STILL IMAGE WITH TEXT
01010 = STILL IMAGE WITH VOICE
01011 = STILL IMAGE WITH VOICE AND TEXT
01100 = STILL IMAGE/MOVING IMAGE COMBINED
01101 = STILL IMAGE/MOVING IMAGE COMBINED,WITH TEXT
01110 = STILL IMAGE/MOVING IMAGE COMBINED,WITH VOICE
01111 = STILL IMAGE/MOVING IMAGE COMBINED,WITH TEXT AND VOICE

CHARACTER DEFINITION TABLE

| CHARACTER ID | NUMBER OF CHARACTER INHERITANCES | PARENT-OBJECT ID | CHILD-OBJECT ID | ... | CHILD-OBJECT ID |
|---|---|---|---|---|---|
| ... | ... | ... | ... | ... | ... |

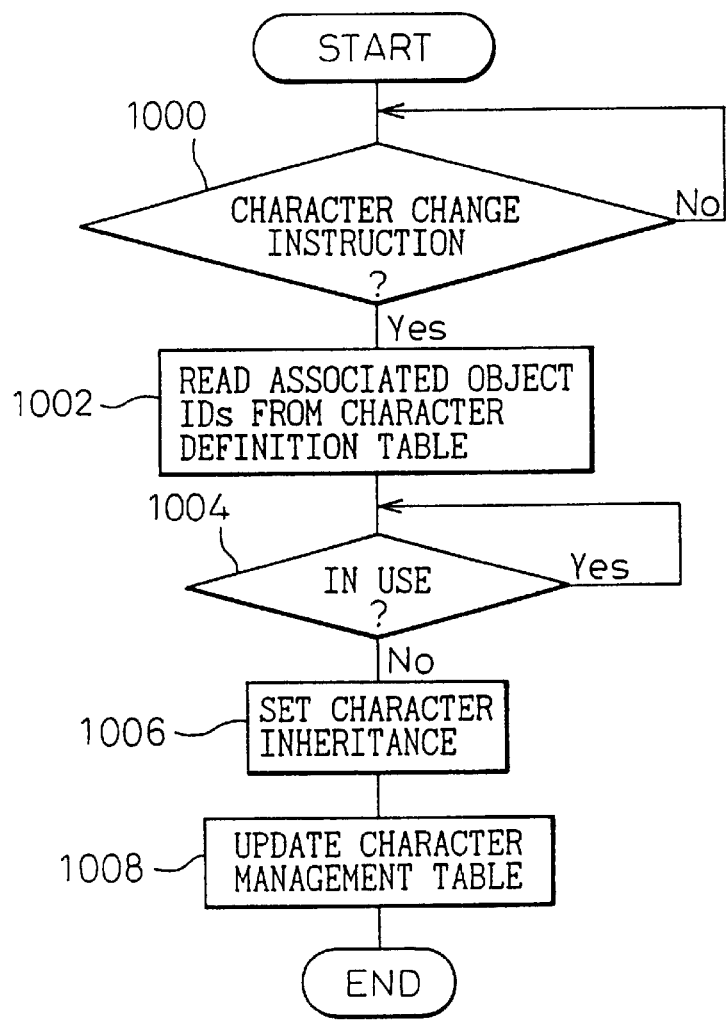

Fig.11

CHARACTER DEFINITION TABLE

| CHARACTER ID | NUMBER OF CHARACTER INHERITANCES | PARENT-OBJECT ID | CHILD-OBJECT ID |
|---|---|---|---|
| UPWARD MOVEMENT | 1 | UP | MOVE |
| DOWNWARD MOVEMENT | 1 | DOWN | MOVE |
| STOP | 1 | PARK | MOVE |

CHARACTER MANAGEMENT TABLE

| OBJECT ID | CHARACTER ID |
|---|---|
| UP | NIL |
| DOWN | NIL |
| PARK | NIL |
| MOVE | NIL |
| LOCATION | NIL |
| NEAREST FLOOR | NIL |

CHARACTER DEFINITION TABLE

| CHARACTER ID | NUMBER OF CHARACTER INHERITANCES | PARENT-OBJECT ID | CHILD-OBJECT ID |
|---|---|---|---|
| UPWARD MOVEMENT | 1 | UP | MOVE |
| DOWNWARD MOVEMENT | 1 | DOWN | MOVE |
| STOP | 1 | PARK | MOVE |

CHARACTER MANAGEMENT TABLE

| OBJECT ID | CHARACTER ID |
|---|---|
| UP | NIL |
| DOWN | NIL |
| PARK | STOP |
| MOVE | STOP |
| LOCATION | NIL |
| NEAREST FLOOR | NIL |

Fig. 14

CHARACTER DEFINITION TABLE

| CHARACTER ID | NUMBER OF CHARACTER INHERITANCES | PARENT-OBJECT ID | CHILD-OBJECT ID |
|---|---|---|---|
| UPWARD MOVEMENT | 1 | UP | MOVE |
| DOWNWARD MOVEMENT | 1 | DOWN | MOVE |
| STOP | 1 | PARK | MOVE |

CHARACTER MANAGEMENT TABLE

| OBJECT ID | CHARACTER ID |
|---|---|
| UP | UPWARD MOVEMENT |
| DOWN | NIL |
| PARK | NIL |
| MOVE | UPWARD MOVEMENT |
| LOCATION | NIL |
| NEAREST FLOOR | NIL |

Fig.16

CHARACTER DEFINITION TABLE

| CHARACTER ID | NUMBER OF CHARACTER INHERITANCES | PARENT-OBJECT ID | CHILD-OBJECT ID |
|---|---|---|---|
| UPWARD MOVEMENT | 1 | UP | MOVE |
| DOWNWARD MOVEMENT | 1 | DOWN | MOVE |
| STOP | 1 | PARK | MOVE |

CHARACTER MANAGEMENT TABLE

| OBJECT ID | CHARACTER ID |
|---|---|
| UP | NIL |
| DOWN | DOWNWARD MOVEMENT |
| PARK | NIL |
| MOVE | DOWNWARD MOVEMENT |
| LOCATION | NIL |
| NEAREST FLOOR | NIL |

Fig.18

# OBJECT-ORIENTED PROCESSING SYSTEM AND OBJECT-ORIENTED CASE APPARATUS

BACKGROUND OF THE INVENTION

1. Field of the Invention

The present invention relates to an object-oriented processing system which is constructed using objects and which carries out prescribed processing, and a computer-aided software engineering (CASE) apparatus used for the construction of the object-oriented processing system, and more particularly to an object-oriented processing system which achieves database searching or data processing not possible with prior known systems by providing a multiple-character object that behaves as if its character changes with the passage of time or with a change in external environmental conditions, and an object-oriented CASE apparatus used for the construction of such an object-oriented processing system.

2. Description of the Related Art

In an object-oriented processing system such as an object-oriented database system or an object-oriented data processing apparatus, individual entities existing in the real world are each abstracted by an object in which a variable describing the properties of the entity and a method describing the behavior thereof are encapsulated together. System processing is then carried out by transferring messages between the user and a particular object and between objects.

In this way, according to the techniques of object-oriented architecture, a system having good visibility and good compatibility with the real world is constructed, so that a system for solving a variety of complex problems can be realized with relative ease. However, in prior known object-oriented systems, the basic idea is to define each object by endowing it with its properties and behavior in a fixed manner; therefore, in the case of an entity whose properties and/or behavior (these qualities are collectively called the character in this specification) change with time or with changing external environmental conditions such as temperature, the plurality of characters that the entity is supposed to assume have to be abstracted by different objects and different identifiers have to be assigned respectively to the different characters. This necessarily results in a large number of similar objects, leading to the problem of increased complexity of relationships among the objects. Furthermore, since a different identifier is assigned to each character of an object, it has not been possible to realize the kind of processing that enables the user to access an object without the user being aware of the change of the character caused according to the passage of time or to a change in external environmental conditions, or that can send a message to such an object and obtain a response according to the character of the object at that instant in time.

SUMMARY OF THE INVENTION

An object of the present invention is to provide an object-oriented processing system in which entities are efficiently modelled and whose characters (properties and/or behaviors) change according to the passage of time or to a change in external environments, and an object-oriented CASE apparatus which assists the development of such a system.

In an object-oriented system, objects include child objects and parent objects to which the child objects are subordinate, and these objects are linked by inheritance relationships. In this case, the properties or behavior that a child object does not have are inherited from its parent object. In prior known object-oriented systems, the inheritance relationships among objects are defined in a fixed manner. The present invention, by contrast, accomplishes the task of changing an object's character by dynamically changing the inheritance relationship according to the passage of time or to a change in external environments.

According to the present invention, there is provided an object-oriented processing system comprising: a database which stores a plurality of objects that perform prescribed processing by transferring messages thereamong, including objects capable of accomplishing a dynamically changeable character by being linked together by a dynamically changeable character inheritance; a character inheritance setting unit which sets a character inheritance between objects according to an instruction, and thereby accomplishes a corresponding character; and a sensor input/output control unit which instructs the character inheritance setting unit to change the character according to the passage of time or to a change in an external environmental condition.

According to the present invention, there is also provided an object-oriented CASE apparatus for assisting the construction of an object-oriented processing system which comprises: a database which stores a plurality of objects that perform prescribed processing by transferring messages thereamong, including objects capable of accomplishing a dynamically changeable character by being linked together by a dynamically changeable character inheritance; a character inheritance setting unit which sets a character inheritance between objects according to an instruction, and thereby accomplishes a corresponding character; and a sensor input/output control unit which instructs the character inheritance setting unit to change the character according to the passage of time or to a change in an external environmental condition, said object-oriented CASE apparatus comprising: a character inheritance creation unit by which a plurality of selectable character inheritances are created interactively to define a plurality of selectable characters for objects, and are stored in the character inheritance setting unit; and a story definition part creation unit by which a story definition part that describes a procedure for changing the character according to the passage of time or to a change in an external environmental condition is created and stored in the sensor input/output control unit.

BRIEF DESCRIPTION OF THE DRAWINGS

FIG. 4 is a diagram showing the data structure of an identifier;

FIG. 6 is a diagram showing the data structure of an external data pointer;

FIG. 7 is a diagram showing a character definition table;

FIG. 8 is a diagram showing a character management table;

FIG. 9 is a flowchart illustrating the operation of a character inheritance setting unit;

FIG. 11 is a diagram showing a character definition table and a character management table in the example of the elevator control system;

FIG. 14 is a diagram showing the character management table where the character "stop" is set;

FIG. 16 is a diagram showing the character management table where the character "upward movement" is set;

FIG. 18 is a diagram showing the character management table where the character "downward movement" is set.

DESCRIPTION OF THE PREFERRED EMBODIMENTS

Figure 1:
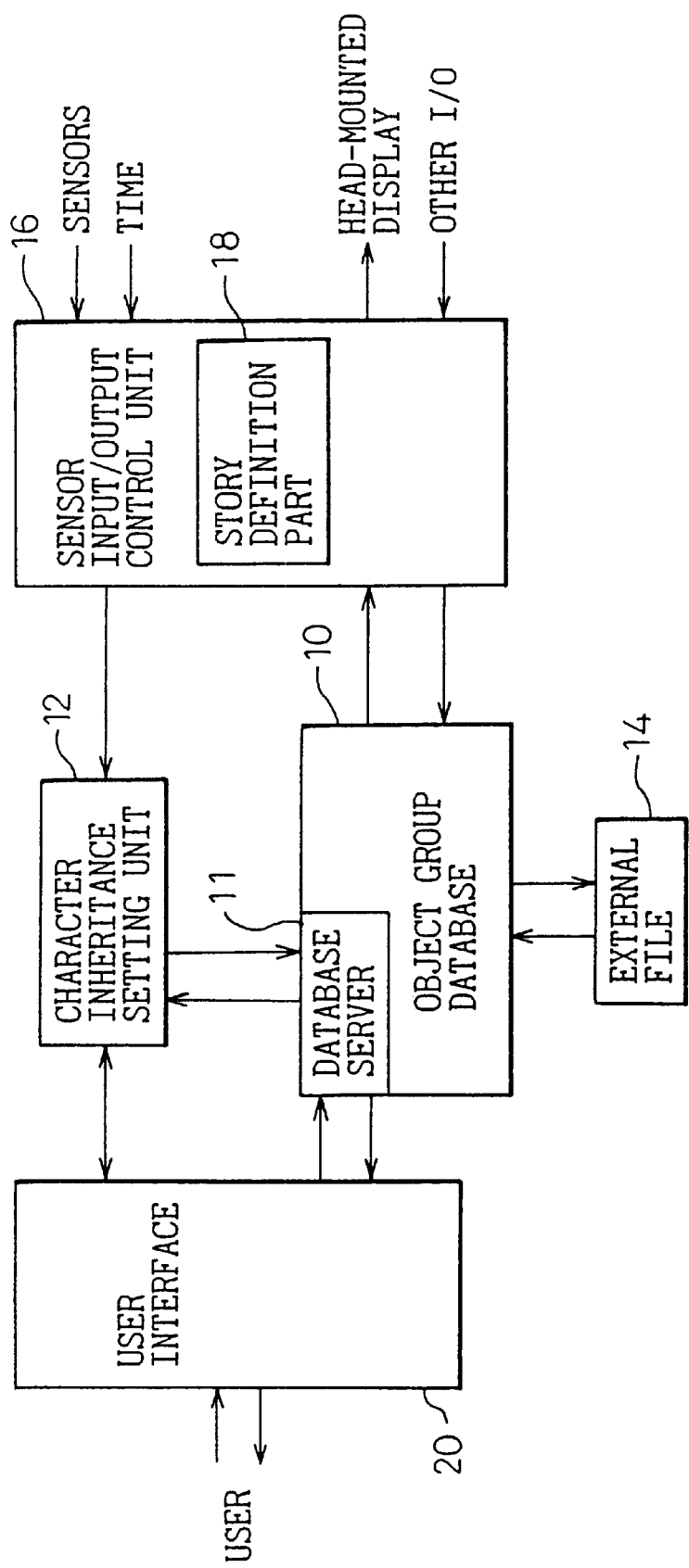
FIG. 1 is a block diagram showing one embodiment of an object-oriented processing system according to the present invention.
Figure 2:
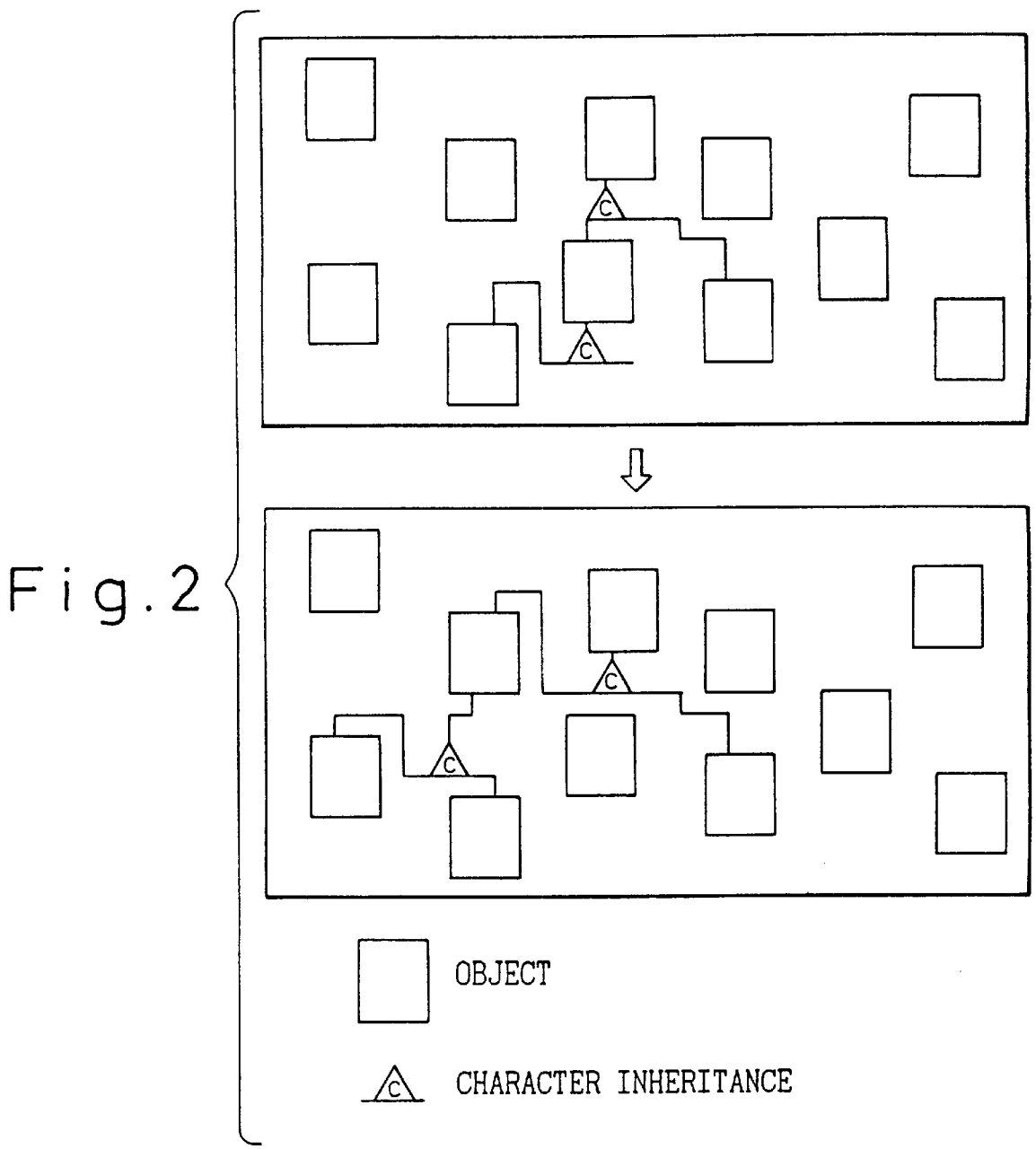
FIG. 2 is a diagram conceptually illustrating character inheritance.

FIG. 1 is a block diagram showing one embodiment of an object-oriented processing system according to the present invention. In FIG. 1, a large number of objects are stored in an object group database 10. All or part of the objects stored in the object group database 10 are linked by inheritance relationships, as shown conceptually in FIG. 2, that are capable of changing dynamically in accordance with the setting made by a character inheritance setting unit 12 (in this specification, such inheritance is hereinafter called the character inheritance). Of data associated with the objects stored in the object group database 10, variable-length data, such as moving image data, still image data, voice data, and text data, are stored in an external file 14, and each of the objects holds a pointer to the storage location of its associated data. A database server 11, which is included in the object group database 10, provides access to a particular object specified by the user or by application software. When a parent object exists with which the accessed object is linked by inheritance or character inheritance, data of variables or methods that the accessed child object does not have are inherited from the parent object. A sensor input/output control unit 16, based on the time and the external environmental conditions supplied from sensors, determines whether the character of the object is to be changed in accordance with a story definition part 18 stored therein, and if the character is to be changed, instructs the character inheritance setting unit 12 to change the character inheritance. The sensor input/output control unit 16 can also perform message transfers to and from the objects stored in the object group database 10 in accordance with the story definition part 18. A user interface 20 provides means of message transfer to and from the user or application software. When the external party is the user, the user interface 20 includes an output device, such as a display or a printer, and an input device such as a keyboard or a mouse. The user or application software also can directly change the character of the object through the user interface 20 and the character inheritance setting unit 12.

Figure 3:
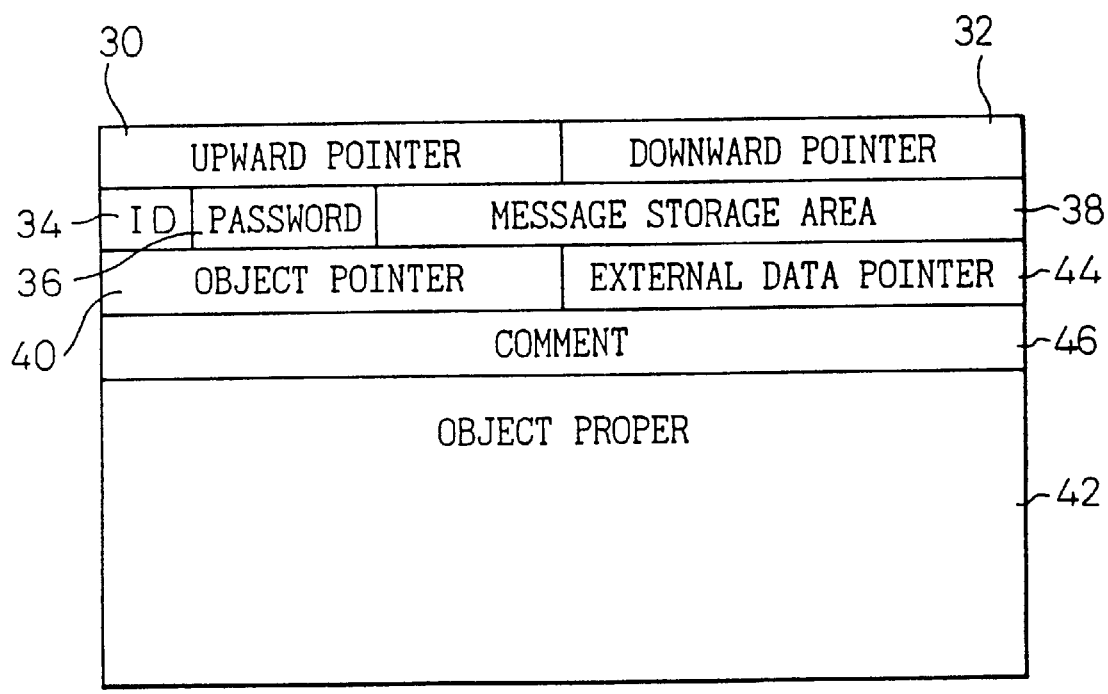
FIG. 3 is a diagram showing the data structure of an object.
Figure 5:
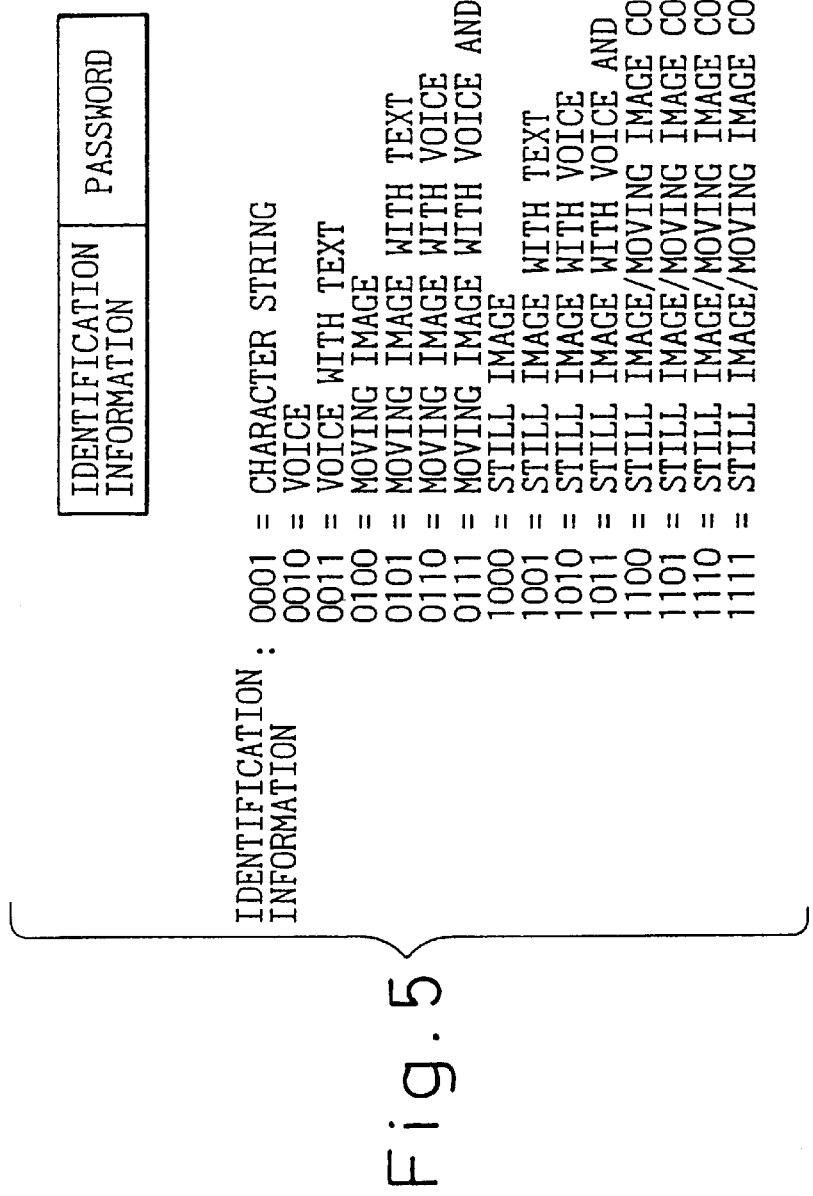
FIG. 5 is a diagram showing the data structure of a password.

FIG. 3 shows the data structure of an object stored in the object group database 10. An upward pointer 30 is a pointer to an object at the next higher level in the character inheritance relationship. A downward pointer 32 is a pointer to an object at the next lower level in the character inheritance relationship. When the character inheritance is not set, null data is stored. An ID 34 is an identifier for identifying an individual object, and consists of "ID number", "identification information", and "name" fields, as shown in detail in FIG. 4. The ID number is a number assigned to each individual object, and the identification information indicates, as shown in FIG. 4, the type of data stored in the "name" field. That is, the objects stored in the object group database 10 can be named using not only a character string but also voice, etc. A password 36 is used to control user access to that object; since the password 36 also has an identification information field, as shown in FIG. 5, data can be stored not only as a character string but also as data of other types. A message storage area 38 is a work area for temporarily storing a message received by the object or a message to be output from the object. An object pointer 40 is a pointer to the object proper 42. An external data pointer 44 is a pointer to data stored in the external file 14 (FIG. 1) among the data associated with the object proper 42. The external data pointer 44 has, in addition to the pointer field, a field indicating the number of pointers and an identification information field indicating the type of data stored in the external file 14, as shown in FIG. 6. A comment 46, like a comment appended to a program list, is included to describe the object. The comment 46 also has an identification information field (not shown) and can therefore store not only a character string but also other types of data.

The character inheritance setting unit 12 (FIG. 1) has a character definition table, such as the one shown in FIG. 7, which defines corresponding relationships between characters and the inter-object character inheritances accomplishing the respective characters, and a character management table, such as the one shown in FIG. 8, which stores the character inheritances on an object-by-object basis. In FIG. 7, the character definition table has a character ID column, a number-of-character inheritances column defining the number of inheritances necessary to accomplish the corresponding character, a parent-object ID column indicating parent objects in the respective character inheritances, and child-object ID columns. The character ID, as well as each of the parent-object ID and the child-object ID, has the same format as that shown in FIG. 4. Therefore, like an object, the character ID also can specify the character by using voice data. In FIG. 8, the character management table has an object ID column and a character ID column indicating the character accomplished by the character inheritance set for the corresponding object. When the character inheritance is not set for an object, null data is set in the character ID column corresponding to that object, and when the character inheritance is set, the character ID corresponding to the character inheritance is set.

FIG. 9 is a flowchart illustrating the operation of the character inheritance setting unit 12. In FIG. 9, when a character change instruction is given from the sensor input/output control unit 16 (FIG. 1) or from the user (step 1000), parent object IDs and child object IDs, associated with the character inheritance to accomplish the specified character, are read out of the character definition table of FIG. 7 (step 1002), and reference is made to the character management table to examine whether any of these objects is currently in use, to accomplish some other character (step 1004). If any of the objects selected for the character inheritance is currently in use to accomplish some other character, the process waits until completion of that use. When none of the associated objects is currently in use, or when the use is completed, the upward pointer 30 or downward pointer 32

(FIG. 3) in each of the associated objects is changed accordingly to set the character inheritance (step 1006), and the contents of the character management table are updated (step 1008).

The object-oriented processing system that uses multiple-character objects according to the present invention will be described in further detail by taking an elevator control system as an example.

Figure 10:
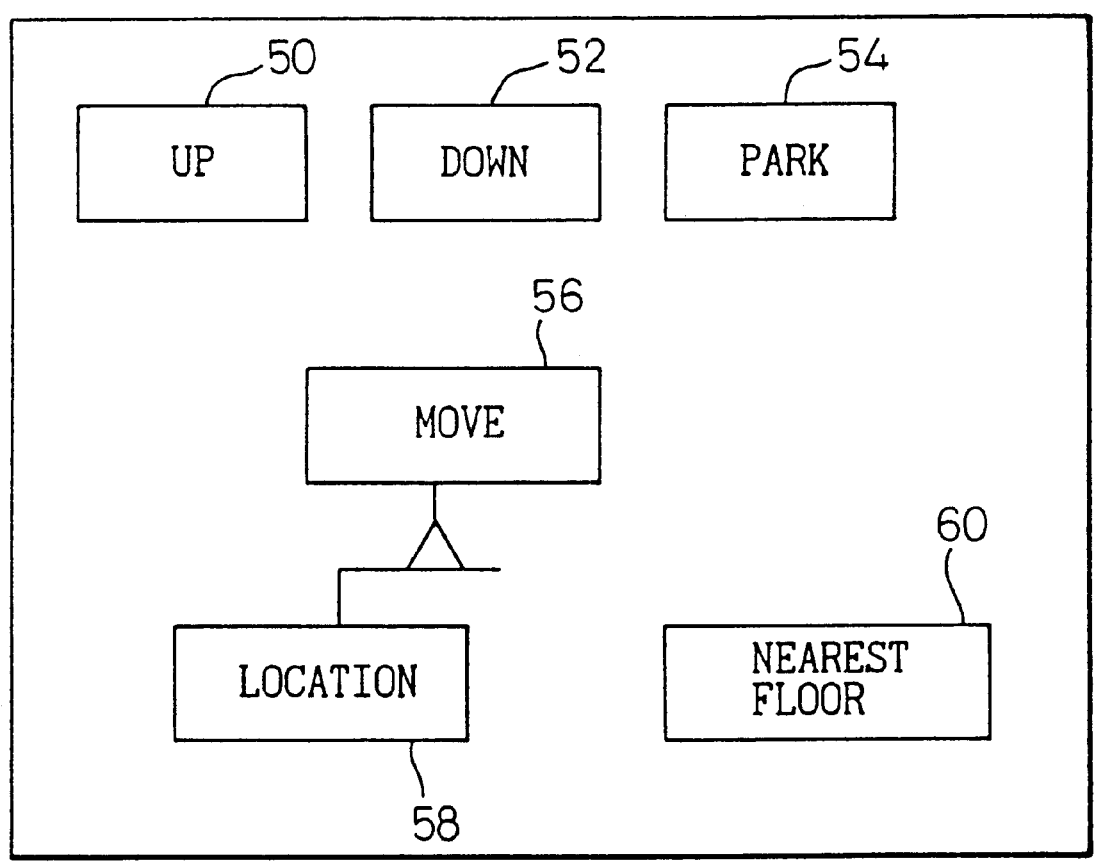
FIG. 10 is a diagram showing objects used in an elevator control system as one example of the object-oriented processing system of the present invention.

As shown in FIG. 10, the database 10 stores an "up" object 50 for setting the direction of elevator travel to "upward", a "down" object 52 for setting the direction of elevator travel to "downward", a "park" object 54 for holding the elevator stopped at a prescribed location, a "move" object 56 for moving the elevator, a "location" object 58 for determining the current location of the elevator, and a "nearest floor" object 60 for determining the amount and the direction of elevator travel to the floor nearest to the current location of the elevator, when call buttons are pressed on the basis of the current location of the elevator and the state of the call button at each floor. Further, as shown in FIG. 11, characters "upward movement", "downward movement", and "stop" are defined in the character definition table, and object regions are provided in the character management table. As shown in the character definition table of FIG. 11, the character "upward movement" is built with the "up" object as a parent object linked by character inheritance with the "move" object as a child object, the character "downward movement" is built with the "down" object linked with the "move" object, and the character "stop" is built with the "park" object linked with the "move" object.

Figure 12:
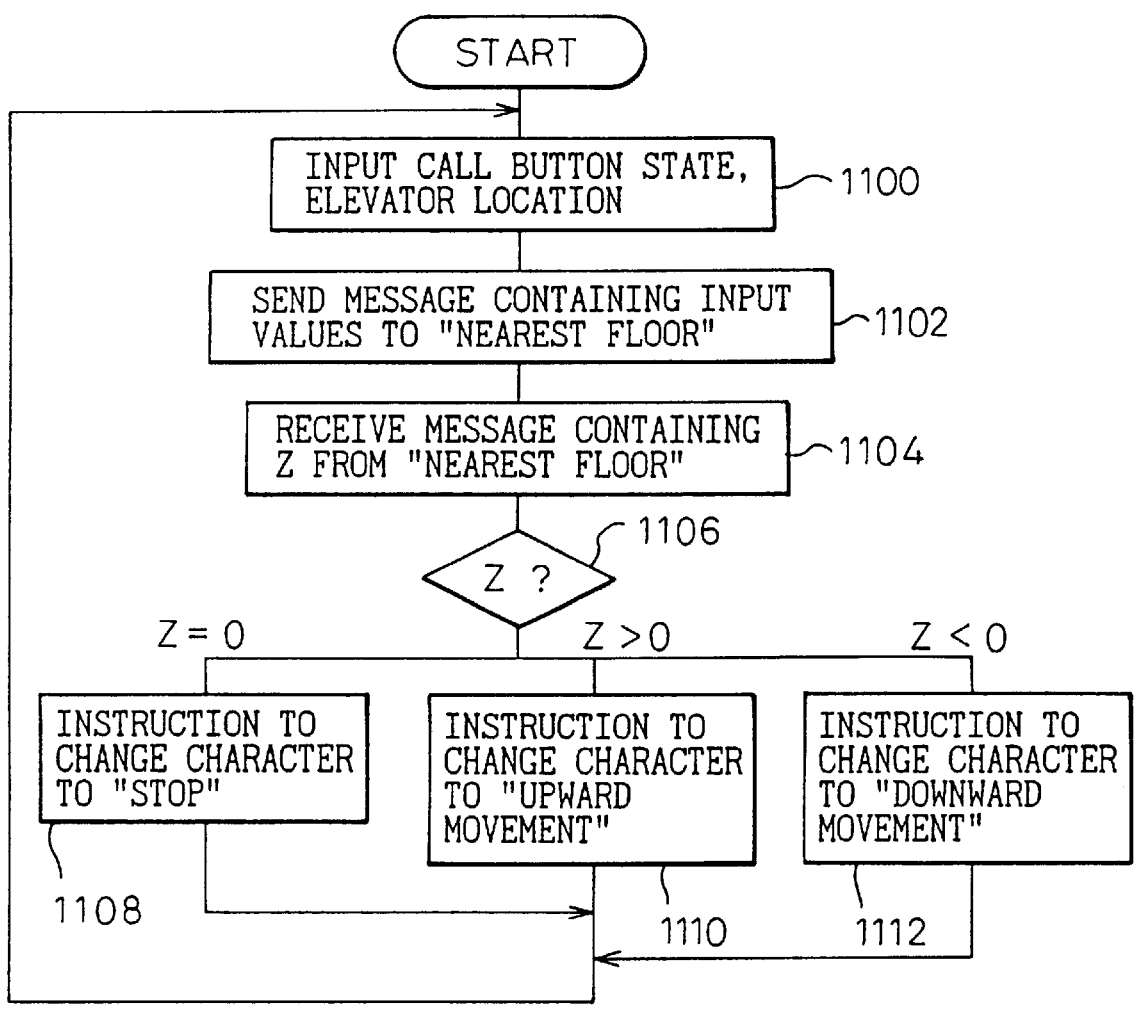
FIG. 12 is a flowchart illustrating the operation of a story definition part in the example of the elevator control system.

FIG. 12 is a flowchart illustrating the operation of the story definition part 18 stored in the sensor input/output control unit 16. For the multiple-character object explained with reference to FIGS. 10 and 11, the story definition part 18 is programmed to perform processing to determine the character which the multiple-character object should assume on the basis of the sensor inputs indicating the state of the call button at each floor and the location of the elevator, and to issue an instruction to the character inheritance setting unit 12 to change the character.

In FIG. 12, first the state of the call button at each floor and the location of the elevator are input (step 1100), and a message containing these input values is sent to the "nearest floor" object. In response, the "nearest floor" object sends a message containing a parameter "Z" indicating the amount and the direction of travel to the floor nearest to the current elevator location, among the floors where the call buttons are pressed. This message is received (step 1104). When the value of Z is 0, an instruction is issued to the character inheritance setting unit 12 to change the character to "stop" (step 1108); when the value of Z is positive, an instruction is issued to the character inheritance setting unit 12 to change the character to "upward movement" (step 1110); and when the value of Z is negative, an instruction is issued to the character inheritance setting unit 12 to change the character to "downward movement" (step 1112).

Figure 13:
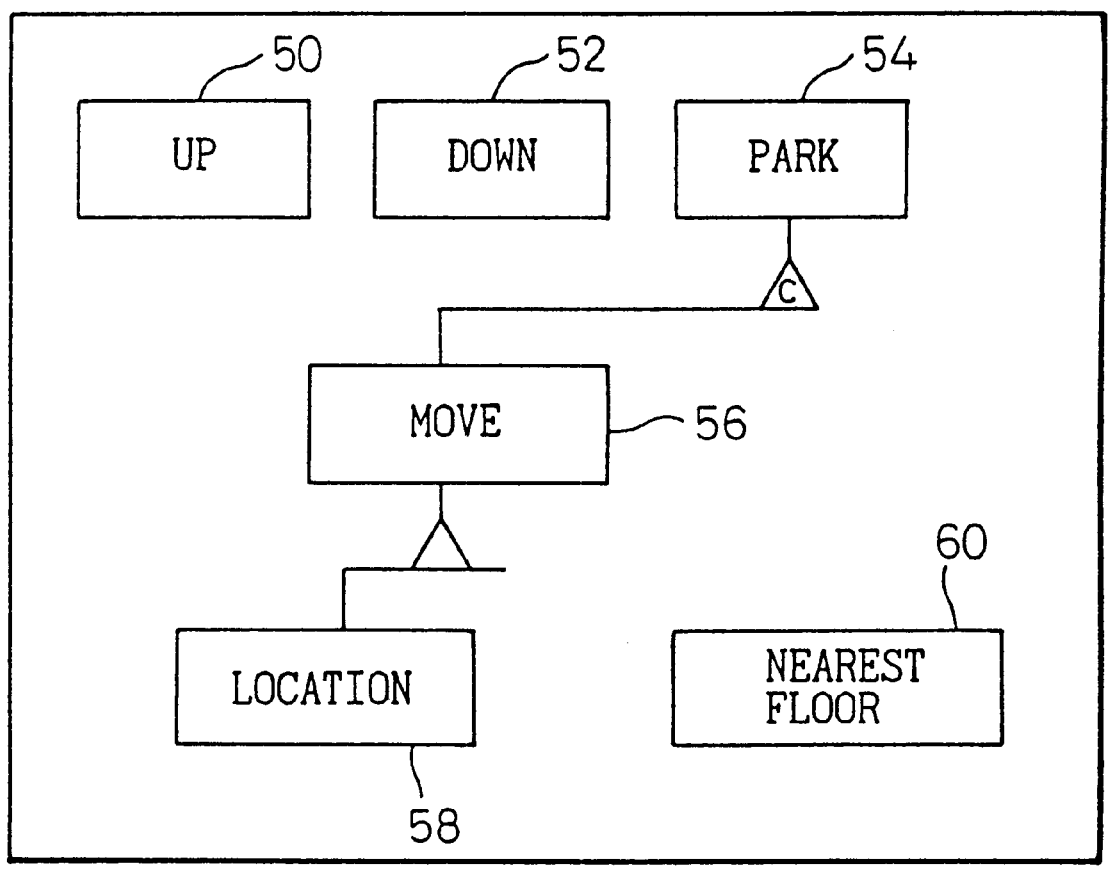
FIG. 13 is a diagram showing a character "stop" in the example of the elevator control system.

When the character "stop" is set, the "park" object 54 and the "move" object 56 are linked together by character inheritance, as shown in FIG. 13. As a result, the properties and behavior of the "park" object are inherited by the "move" object which is thus endowed with the character "stop". At this time, in the character management table, the character "stop" is set in the rows of the "park" object and the "move" object, as shown in FIG. 14, preventing these objects from being changed to other characters until completion of their use.

Figure 15:
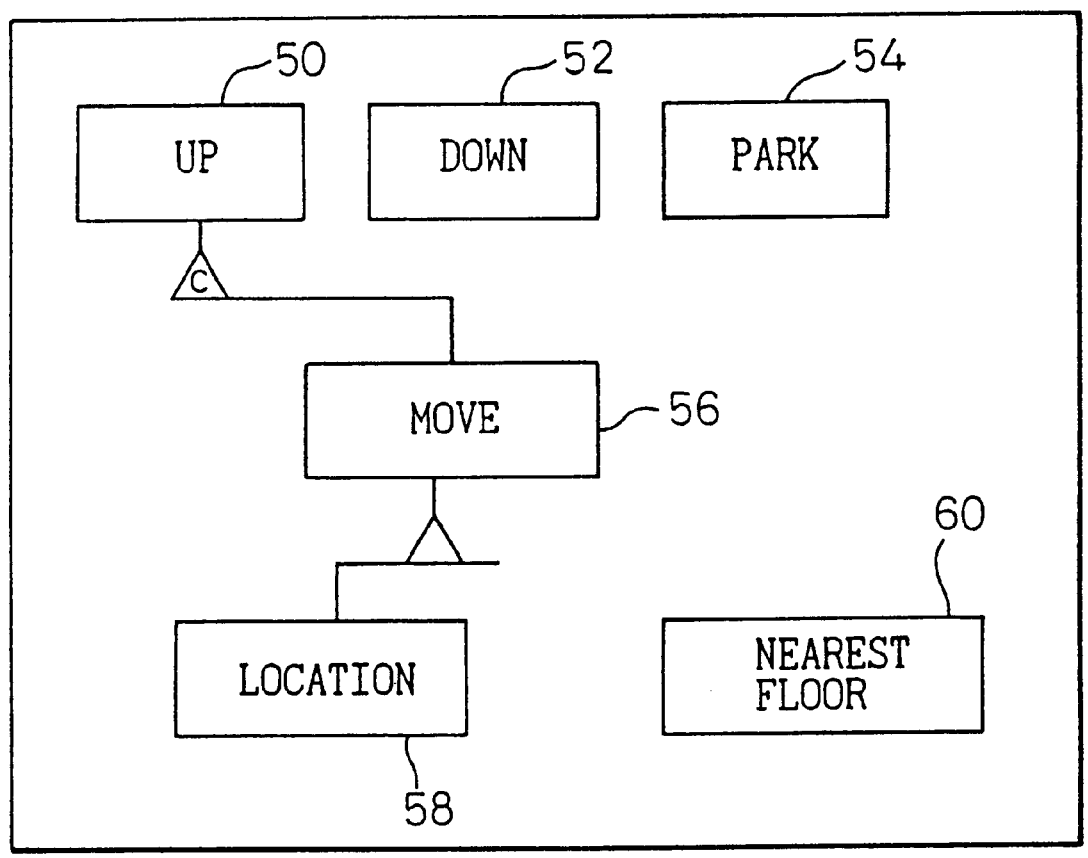
FIG. 15 is a diagram showing a character "upward movement"

When the character "upward movement" is set, the "up" object 50 and the "move" object 56 are linked together by character inheritance, as shown in FIG. 15. As a result, the properties and behavior of the "up" object are inherited by the "move" object which is thus endowed with the character "upward movement". At this time, in the character management table, the character "upward movement" is set in the rows of the "up" object and the "move" object, as shown in FIG. 16, preventing these objects from being changed to other characters until completion of their use.

Figure 17:
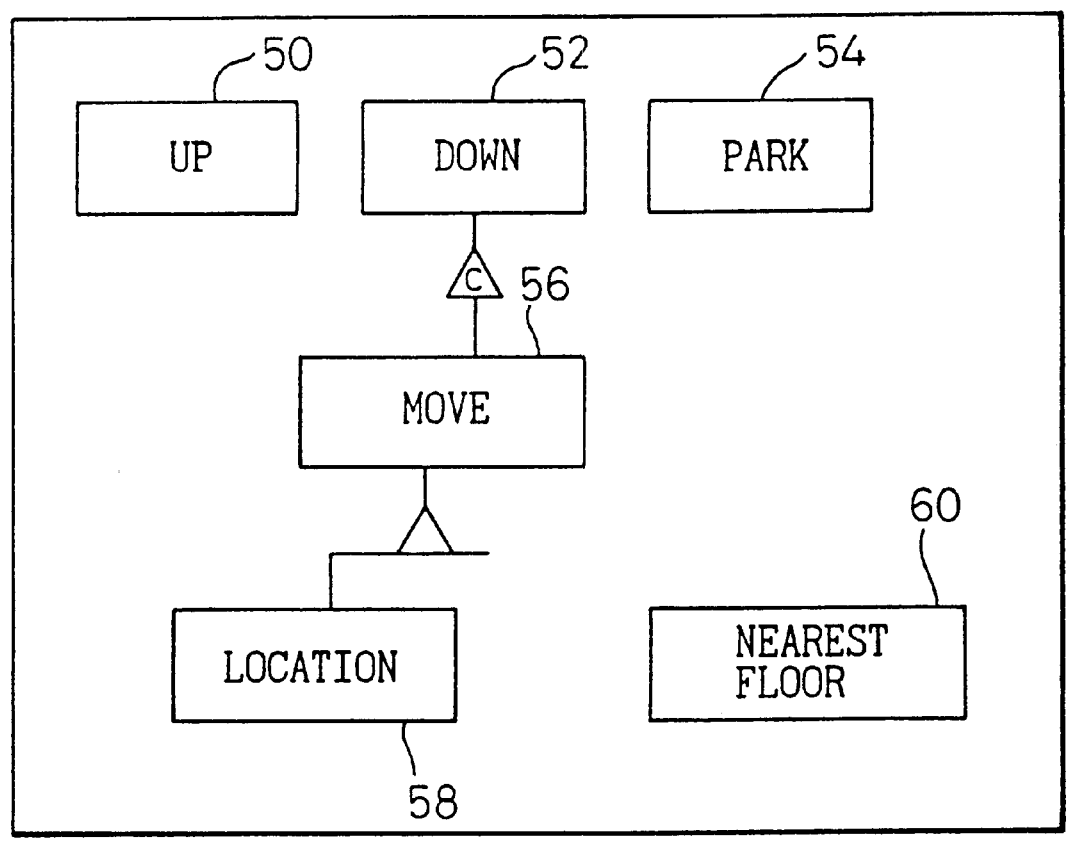
FIG. 17 is a diagram showing a character "downward movement"

When the character "downward movement" is set, the "down" object 52 and the "move" object 56 are linked together by character inheritance, as shown in FIG. 17. As a result, the properties and behavior of the "down" object are inherited by the "move" object which is thus endowed with the character "downward movement". At this time, in the character management table, the character "downward movement" is set in the rows of the "down" object and the "move" object, as shown in FIG. 18, preventing these objects from being changed to other characters until completion of their use.

In this way, the character of the "move" object changes adaptively according to the sensor inputs. When the user simply accesses and activates the "move" object, since its character changes adaptively according to the sensor inputs, control appropriate to sensor states can be achieved easily.

Though not shown here, if a "high speed" object and a "low speed" object are provided, and if the "high speed" object is linked during morning and evening hours and the "low speed" object is linked during other daytime hours, control can be achieved to operate the elevator at high speed during morning and evening hours and at low speed during other daytime hours.

Figure 19:
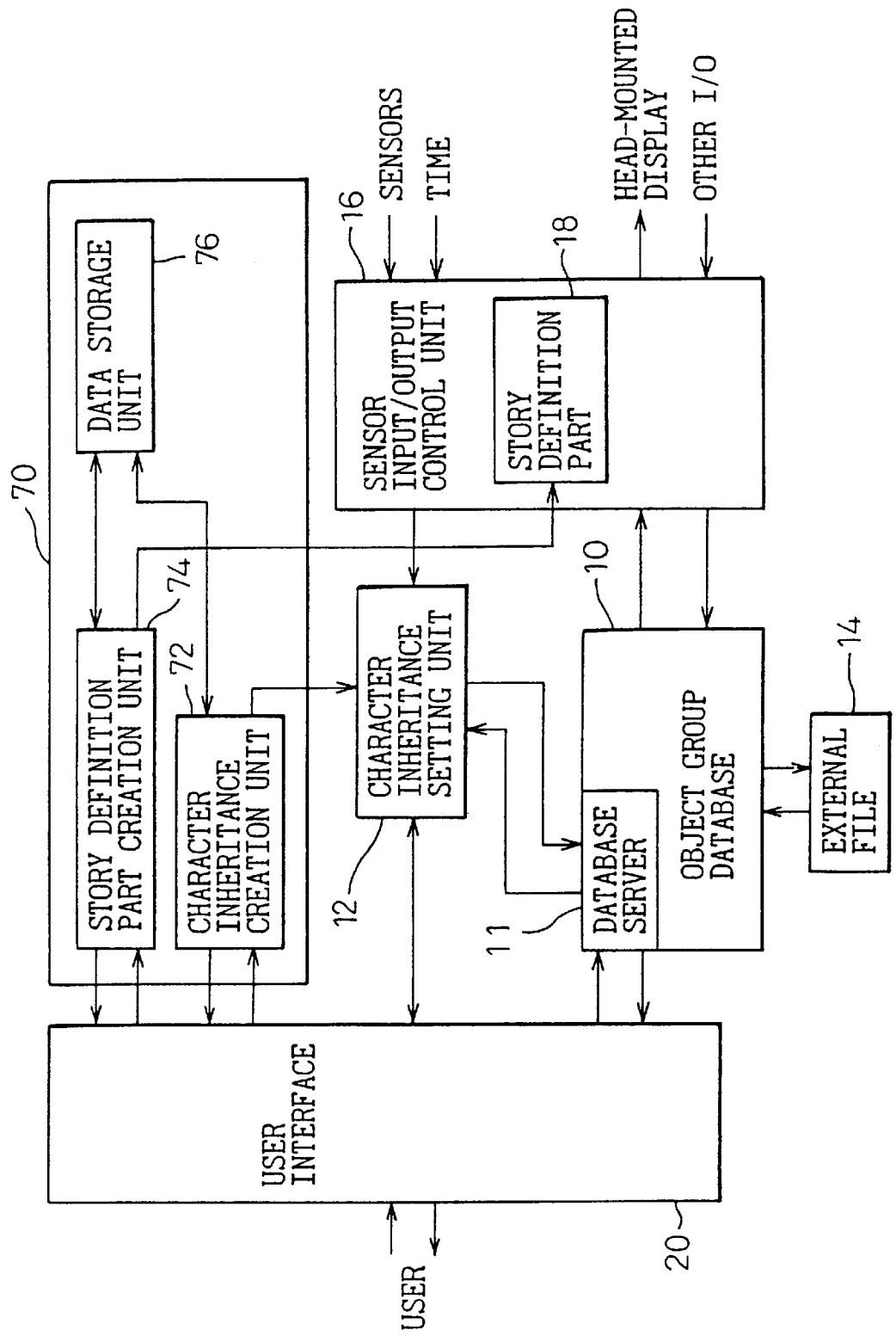
FIG. 19 is a block diagram showing one embodiment of an object-oriented CASE apparatus according to the present invention.

FIG. 19 is a block diagram showing the configuration of an object-oriented CASE apparatus according to the present invention for assisting the development of the object-oriented processing system of the invention that uses multiple-character objects. The CASE apparatus 70 of the invention comprises a character inheritance creation unit 72, a story definition part creation unit 74, and a data storage unit 76.

The character inheritance creation unit 72 assists the user to create character inheritance definitions interactively via the user interface 20. In the above-described example of the elevator control system, the "up" object, "down" object, "move" object, "location" object, and "nearest floor" object are prestored in the object group database 10, and with the assistance of the character inheritance creation unit 72, the user creates the screens shown in FIGS. 13, 15, and 17 to define the characters "upward movement", "downward movement", and "stop". The screen data are then stored in the data storage unit 76. The character inheritance creation unit 72 converts the screen data stored in the data storage unit 76 into the character definition table and character management table shown in FIG. 11, and stores the tables in the character inheritance setting unit 12.

The story definition part creation unit 74 assists the creation of the story definition part shown in the flowchart of FIG. 12. The thus created story definition part is stored in the sensor input/output control unit 16. First, an operation test is performed using a simulation model of the story definition part with key inputs substituted for sensor inputs, etc., and after completion of the operation test, sensor inputs, etc. are substituted for the key inputs.

What is claimed is:

1. An object-oriented processing system, comprising:

a database which stores a plurality of objects that perform prescribed processing by transferring messages thereamong, including objects capable of accomplishing a dynamically changeable character by being linked together by a dynamically changeable character inheritance;

a character inheritance setting unit which sets a character inheritance between objects according to an instruction, and thereby accomplishes a corresponding character; and A sensor input/output control unit changing the character inheritance set by the character inheritance setting unit, by instructing the character inheritance setting unit to change the character according to a variable.

2. An object-oriented CASE apparatus according to claim 1, wherein the variable comprises a passage of time or a change in an external environmental condition.

3. An object-oriented processing system, comprising:

a database which stores a plurality of objects that perform prescribed processing by transferring messages thereamong, including objects capable of accomplishing a dynamically changeable character by being linked together by a dynamically changeable character inheritance;

a character inheritance setting unit which sets a character inheritance between objects according to an instruction, and thereby accomplishes a corresponding character; and a sensor input/output control unit which instructs the character inheritance setting unit to change the character according to a variable, wherein the character inheritance setting unit includes:

a character definition table which stores correspondence between a character inheritance setting and a character to be accomplished by the setting, and a character management table which stores a character accomplished by character inheritance currently set in an object capable of being linked by character inheritance.

4. An object-oriented processing system according to claim 3, wherein the sensor input/output control unit stores a story definition part which describes a procedure for changing the character according to the passage of time or to a change in an external environmental condition.

5. An object-oriented CASE apparatus for assisting the construction of an object-oriented processing system, wherein:

the object-oriented processing system comprises:

a database which stores a plurality of objects that perform prescribed processing by transferring messages thereamong, including objects capable of accomplishing a dynamically changeable character by being linked together by a dynamically changeable character inheritance; a character inheritance setting unit which sets a character inheritance between objects according to an instruction, and thereby accomplishes a corresponding character; and a sensor input/output control unit changing the character inheritance set by the character inheritance setting step, by instructing the character inheritance setting unit to change the character according to the passage of time or to a change in an external environmental condition; and said object-oriented CASE apparatus comprises:

a character inheritance creation unit for interactively creating a plurality of selectable character inheritances to define a plurality of selectable characters for objects, said character inheritances being stored in the character inheritance setting unit, and a story definition part creation unit for creating a story definition part that describes a procedure for changing the character according to the passage of time or to a change in an external environmental condition, said story definition part being stored in the sensor input/output control unit.

6. An object-oriented CASE apparatus according to claim 5, wherein the character inheritance creation unit converts definitions of the interactively created character inheritances into a character definition table, which stores correspondence between a character inheritance setting and a character accomplished by the setting, and a character management table, which stores a character accomplished by character inheritance currently set in an object capable of being linked by character inheritance, and stores said tables in the character inheritance setting unit.

7. An object-oriented processing system comprising:

a database storing plural objects;

a unit selectively linking objects by a dynamically changeable character inheritance; and a control unit changing a character inheritance, set for selectively linking objects by a character inheritance setting unit, by instructing the character inheritance setting unit to change the character according to a variable.

8. An object-oriented processing system according to claim 7, wherein the unit is responsive to a variable for correspondingly changing the dynamically changeable character inheritance.

9. An object-oriented processing system according to claim 8, wherein the variable comprises an passage of time or a change in an external environmental condition.

10. An object-oriented processing system according to claim 9, further comprising a sensor responding to a passage of time and a change in an external environmental condition and producing a corresponding output as the variable.

11. An object-oriented processing method comprising the steps of:

storing a plurality of objects that perform prescribed processing by transferring messages thereamong, including objects capable of accomplishing a dynamically changeable character by being linked together by a dynamically changeable character inheritance;

setting a character inheritance between objects according to an instruction, and thereby accomplishing a corresponding character; and changing the character inheritance set by the character inheritance setting step, by causing the character inheritance setting step to change the character according to a variable.

12. An object-oriented CASE apparatus according to claim 11, wherein the variable comprises a passage of time or a change in an external environmental condition.

13. An object-oriented processing method, comprising the steps of:

storing a plurality of objects that perform prescribed processing by transferring messages thereamong, including objects capable of accomplishing a dynamically changeable character by being linked together by a dynamically changeable character inheritance;

setting a character inheritance between objects by a character inheritance setting unit according to an instruction, and thereby accomplishing a corresponding character; and instructing the character inheritance setting unit to change the character according to a variable, wherein the step of setting the character inheritance further includes:

storing a correspondence between a character inheritance setting and a character to be accomplished by the setting, and storing a character accomplished by a character inheritance currently set in an object capable of being linked by character inheritance.

14. An object-oriented processing method according to claim 13, further comprising storing a story definition part which describes a procedure for changing the character according to the passage of time or to a change in an external environmental condition.

15. An object-oriented CASE method for assisting the construction of an object-oriented processing method, wherein:

the object-oriented processing method comprises:

storing a plurality of objects that perform prescribed processing by transferring messages thereamong, including objects capable of accomplishing a dynamically changeable character by being linked together by a dynamically changeable character inheritance;

setting a character inheritance between objects according to an instruction, and thereby accomplishing a corresponding character;

changing the character inheritance set by the character inheritance setting step thereby to change the character according to the passage of time or to a change in an external environmental condition; and said object-oriented CASE method comprises:

interactively creating a plurality of selectable character inheritances to define a plurality of selectable characters for objects, and storing said character inheritances in the character inheritance setting unit, and creating a story definition part that describes a procedure for changing the character according to the passage of time or to a change in an external environmental condition and storing said story definition part.

16. An object-oriented CASE method for assisting the construction of an object-oriented processing method, wherein:

the object-oriented processing method comprises;

storing a plurality of objects that perform prescribed processing by transferring messages thereamong, including objects capable of accomplishing a dynamically changeable character by being linked together by a dynamically changeable character inheritance; setting a character inheritance between objects according to an instruction, and thereby accomplishing a corresponding character; and changing the character according to the passage of time or to a change in an external environmental condition;

said object-oriented CASE method comprises:

interactively creating a plurality of selectable character inheritances to define a plurality of selectable characters for objects, and storing said character inheritances in the character inheritance setting unit, and creating a story definition part that describes a procedure for changing the character according to the passage of time or to a change in an external environmental condition and storing said story definition part, further comprising:

converting definitions of the interactively created character inheritances into a character definition table, which stores correspondence between a character inheritance setting and a character accomplished by the setting, and storing a character accomplished by a character inheritance currently set in an object capable of being linked by character inheritance, and storing said tables.

17. An object-oriented processing system, comprising:

a database which stores a plurality of objects that perform prescribed processing by transferring messages thereamong, including objects capable of accomplishing a dynamically changeable character by being linked together by a dynamically changeable character inheritance;

a character inheritance setting unit which sets a character inheritance between objects according to an instruction and thereby accomplishes a corresponding character; and a sensor input/output control unit which determines whether the character is to be changed and which instructs changes the character inheritance set by the character inheritance setting unit by instructing the character inheritance setting unit to change the character by a variable, when the character is to be changed.

18. An object oriented processing system, comprising:

storing a plurality of objects that perform prescribed processing by transferring messages thereamong, including objects capable of accomplishing a dynamically changeable character by being linked together by a dynamically changeable character inheritance;

setting a character inheritance between objects according to an instruction and thereby accomplishing a corresponding character; and changing the character inheritance set by the character inheritance setting step, by instructing a change of the character inheritance setting when the character is to be changed.

\* \* \* \* \*

UNITED STATES PATENT AND TRADEMARK OFFICE
CERTIFICATE OF CORRECTION

PATENT NO. : 6,377,954 B1
DATED : April 23, 2002
INVENTOR(S) : Yoshifusa Togawa

It is certified that error appears in the above-identified patent and that said Letters Patent is hereby corrected as shown below:

<u>Title page,</u>
Item [56], References Cited, U.S. PATENT DOCUMENTS, sixth listed reference, change "Bresleau et al." to -- Breslau et al. --.

<u>Column 8,</u>
Line 37, change "an" to -- a --.

Signed and Sealed this

Third Day of September, 2002

Attest:

Attesting Officer

JAMES E. ROGAN
*Director of the United States Patent and Trademark Office*